US012271118B2

(12) United States Patent
Kita et al.

(10) Patent No.: US 12,271,118 B2
(45) Date of Patent: Apr. 8, 2025

(54) IMAGE FORMING APPARATUS

(71) Applicant: CANON KABUSHIKI KAISHA, Tokyo (JP)

(72) Inventors: Hiroshi Kita, Mishima (JP); Kazuhiro Funatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/631,643

(22) Filed: Apr. 10, 2024

(65) Prior Publication Data

US 2024/0264547 A1 Aug. 8, 2024

Related U.S. Application Data

(63) Continuation of application No. 17/683,794, filed on Mar. 1, 2022, now Pat. No. 11,988,973, which is a (Continued)

(30) Foreign Application Priority Data

May 8, 2018 (JP) ................................ 2018-090100

(51) Int. Cl.
*G03G 15/01* (2006.01)
*G03G 15/00* (2006.01)
*G03G 15/06* (2006.01)

(52) U.S. Cl.
CPC ..... *G03G 15/0152* (2013.01); *G03G 15/0121* (2013.01); *G03G 15/065* (2013.01); *G03G 15/5008* (2013.01); *G03G 15/556* (2013.01)

(58) Field of Classification Search
CPC ........... G03G 15/5008; G03G 15/5058; G03G 15/0131; G03G 15/50; G03G 15/556
See application file for complete search history.

(56) References Cited

U.S. PATENT DOCUMENTS

| | | | | |
|---|---|---|---|---|
| 5,502,579 A | | 3/1996 | Kita et al. | |
| 5,883,632 A | * | 3/1999 | Dillinger | H04N 1/6052 345/589 |

(Continued)

FOREIGN PATENT DOCUMENTS

| | | |
|---|---|---|
| CN | 107219734 A | 9/2017 |
| EP | 1 804 134 A2 | 7/2007 |

(Continued)

OTHER PUBLICATIONS

Examination Report dated Aug. 28, 2024, in European Patent Application No. 19172441.8.

(Continued)

*Primary Examiner* — Jessica L Eley
(74) *Attorney, Agent, or Firm* — Venable LLP

(57) ABSTRACT

An image forming apparatus has a normal image formation mode and a wide color gamut image formation mode in which an amount of a developer per unit area of a developer image of at least a color that differs from a prescribed color among a plurality of colors is increased as compared to the normal image formation mode. Image data is generated such that an image portion formed in the prescribed color in an image formed on a recording material is formed solely by a developer image of the prescribed color in the normal image formation mode, but formed by superimposing a developer image of a color that differs from the prescribed color on a developer image of the prescribed color or formed solely by a developer image of a different color in place of a developer image of the prescribed color in the wide color gamut image formation mode.

11 Claims, 10 Drawing Sheets

Related U.S. Application Data continuation of application No. 17/177,463, filed on Feb. 17, 2021, now Pat. No. 11,287,759, which is a continuation of application No. 16/397,435, filed on Apr. 29, 2019, now Pat. No. 10,948,842.

(56) References Cited

U.S. PATENT DOCUMENTS

| | | | | |
|---|---|---|---|---|
| 5,897,239 | A | 4/1999 | Caruthers, Jr. et al. | |
| 8,422,900 | B2 | 4/2013 | Aoki et al. | |
| 9,020,376 | B2 | 4/2015 | Ito et al. | |
| 9,116,470 | B2 | 8/2015 | Shirafuji et al. | |
| 9,612,557 | B2 * | 4/2017 | Yuasa | G03G 15/5008 |
| 10,168,633 | B2 | 1/2019 | Nakahara et al. | |
| 10,331,064 | B2 * | 6/2019 | Hirota | G03G 15/5025 |
| 10,539,907 | B2 | 1/2020 | Shimomura et al. | |
| 10,599,063 | B2 | 3/2020 | Naito et al. | |
| 11,287,759 | B2 | 3/2022 | Kita et al. | |
| 2005/0036798 | A1 | 2/2005 | Mochizuki | |
| 2008/0038657 | A1 | 2/2008 | Yamazaki et al. | |
| 2009/0257780 | A1 | 10/2009 | Maruyama et al. | |
| 2010/0080597 | A1 | 4/2010 | Seki et al. | |
| 2011/0164888 | A1 | 7/2011 | Kubo et al. | |
| 2014/0072319 | A1 | 3/2014 | Sato | |
| 2014/0168670 | A1 | 6/2014 | Ichinose et al. | |
| 2014/0301748 | A1 | 10/2014 | Suzuki et al. | |
| 2014/0369723 | A1 | 12/2014 | Takahashi et al. | |
| 2015/0227086 | A1 | 8/2015 | Kondoh et al. | |
| 2016/0187807 | A1 | 6/2016 | Hirai et al. | |
| 2016/0252843 | A1 | 9/2016 | Kanno | |
| 2017/0277056 | A1 * | 9/2017 | Nakahara | G03G 15/5008 |
| 2017/0277068 | A1 | 9/2017 | Naito et al. | |
| 2017/0277093 | A1 | 9/2017 | Hirota et al. | |
| 2017/0285546 | A1 | 10/2017 | Saito et al. | |
| 2019/0011849 | A1 | 1/2019 | Funatani | |
| 2019/0018355 | A1 | 1/2019 | Kudo et al. | |

FOREIGN PATENT DOCUMENTS

| | | | |
|---|---|---|---|
| JP | 63-149662 | A | 6/1988 |
| JP | 7-87346 | A | 3/1995 |
| JP | 2000-122412 | A | 4/2000 |
| JP | 2002-351164 | A | 12/2002 |
| JP | 2005-106923 | A | 4/2005 |
| JP | 2010-262182 | A | 11/2010 |
| JP | 2013-236335 | A | 11/2013 |
| JP | 2017-173460 | A | 9/2017 |
| JP | 2017-173465 | A | 9/2017 |
| JP | 2017-173466 | A | 9/2017 |
| JP | 2017-173800 | A | 9/2017 |
| JP | 2017-181964 | A | 10/2017 |
| JP | 7292960 | B2 | 6/2023 |
| RU | 2 519 015 | C2 | 6/2014 |

OTHER PUBLICATIONS

Extended European Search Report dated Oct. 10, 2019, in European Patent Application No. 19172441.8.

Notice of Allowance dated Feb. 28, 2020, in Russian Patent Application No. 2019113754.

Office Action dated Oct. 14, 2021, in Korean Patent Application No. 10-2019-0053575.

Office Action dated Jan. 6, 2022, in Chinese Patent Application No. 201910377666.1.

Notice of Allowance dated Nov. 1, 2022, in Korean Patent Application No. 10-2022-0081056.

Japanese Office Action dated Feb. 7, 2023, in Japanese Patent Application No. 2019-088311.

Office Action dated Apr. 2, 2024, in Japanese Patent Application No. 2023-094297.

* cited by examiner

IMAGE FORMING APPARATUS

BACKGROUND OF THE INVENTION

Field of the Invention

The present invention relates to a color image forming apparatus adopting an electrophotographic system that fixes, as a fixed image, an unfixed toner image of object image information which is formed on and borne by a recording material (a transfer material, printing paper) in an image forming process portion using an intermediate transfer system or a direct transfer system.

Description of the Related Art

Among color image forming apparatuses adopting an electrophotographic system, there is an image forming apparatus having a wide color gamut image formation mode (hereinafter, a wide color gamut mode) which expands a color reproduction range (Japanese Patent Application Laid-open No. 2017-173465). For example, the color reproduction range is expanded by increasing a peripheral velocity of a developing roller as a developer bearing member relative to a peripheral velocity of a photosensitive drum as an image bearing member in order to increase a toner amount per unit area on the photosensitive drum.

According to Japanese Patent Application Laid-open No. 2017-173465, by forming an image with a developer amount corresponding to a normal image formation mode (hereinafter, a normal mode) in a boundary portion between a region to be given a wide color gamut and a region that does not require a wide color gamut, both suppression of spatter of the developer and a wide color gamut can be achieved.

However, applying the wide color gamut mode to all colors (black (hereinafter, Bk), magenta (hereinafter, M), cyan (hereinafter, C), and yellow (hereinafter, Y)) does not always suit a user's needs. For example, since Bk is mainly used in characters, when there is a level difference in a developer amount in a contour portion as described in Japanese Patent Application Laid-open No. 2017-173465, contour portions may become blurred in character portions which are made up of fine lines to begin with and legibility of characters may decline. In addition, since an amount of consumption of Bk is larger than those of other colors, cases that are undesirable from the perspective of an amount of color material consumption are also expected. A user desiring to give only a specific color a wide color gamut such as a case where bargain basement prices are printed in dark red in the retail industry may experience a similar situation. Specifically, it is not desirable to shorten lifetimes of colors which use large amounts of M and Y in order to reproduce, but use C and Bk less frequently and which do not require a wide color gamut by causing a developing portion to rotate more than usual.

Based on the above, while image formation conditions (operating conditions of an image forming apparatus) in which a wide color gamut mode is not applied to all colors may conceivably be set, such a case is also not without problems. When the wide color gamut mode is applied, a transfer setting that is higher than normal must be configured in order to efficiently transfer a larger amount of the developer than under normal conditions to a recording material. In this case, with respect to colors to which the wide color gamut mode is not applied, since a higher-than-necessary electric field intensity causes charge inversion and a deterioration of transfer efficiency (an increase in a re-transfer rate (a ratio of toner that is initially transferred but subsequently returned to a drum)), density declines as compared to during a normal mode. Therefore, a problem arises in that a color difference between a color to be given a wide color gamut and a color of a normal color gamut becomes more noticeable than when all colors are printed in the normal mode and, consequently, image quality declines.

SUMMARY OF THE INVENTION

An image forming apparatus according to the present invention is an image forming apparatus having an image forming portion capable of forming an image on a recording material using developer images of a plurality of colors including a first color and a second color, the image forming apparatus comprising:

a data generator which generates first image data for forming a developer image of the first color and second image data for forming a developer image of the second color, wherein the image forming portion includes:

a first image bearing member corresponding to the first color;

a second image bearing member corresponding to the second color;

a first light-emitting unit which irradiates the first image bearing member with light and which forms an electrostatic latent image based on the first image data;

a second light-emitting unit which irradiates the second image bearing member with light and which forms an electrostatic latent image based on the second image data;

a first developing member which supplies a developer to the electrostatic latent image formed on the first image bearing member; and a second developing member which supplies a developer to the electrostatic latent image formed on the second image bearing member, in which the image forming portion operates, during a wide color gamut mode, to increase a developer supply capability to the second image bearing member compared to a normal mode so as to exceed a developer supply capability to the first image bearing member, in which in the wide color gamut mode, the data generator generates image data of the second color corresponding to an image portion indicated by the first image data or generates image data of a plurality of colors constituting the second color corresponding to the image portion, and in which the image forming apparatus further comprises a unit which superimposes and forms developer images of a plurality of colors based on the first image data and the second image data generated by the data generator.

In addition, in order to achieve the object described above, an image forming apparatus according to the present invention is an image forming apparatus comprising an image forming portion capable of forming an image on a recording material using developer images of a plurality of colors including a first color and a second color, wherein the image forming portion includes:

a first image bearing member corresponding to the first color;

a second image bearing member corresponding to the second color;

a first light-emitting unit which irradiates the first image bearing member with light and which forms an electrostatic latent image;

a second light-emitting unit which irradiates the second image bearing member with light and which forms an electrostatic latent image;

a first developing member which supplies a developer to the electrostatic latent image formed on the first image bearing member; and a second developing member which supplies a developer to the electrostatic latent image formed on the second image bearing member, the image forming portion operates, during a wide color gamut mode, to increase a developer supply capability to the second image bearing member so as to exceed a developer supply capability to the first image bearing member, and an average particle size of a developer of the first color is smaller than an average particle size of a developer of the second color.

Further features of the present invention will become apparent from the following description of exemplary embodiments (with reference to the attached drawings).

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Examples of image forming apparatuses to which the present invention is applied include a copier, a laser beam printer (LBP), a printer, a facsimile machine, a microfilm reader-printer, and a recording device which adopt an electrophotographic system image forming process. These image forming apparatuses fix, as a fixed image, an unfixed toner image of object image information which is formed on and borne by a recording material (a transfer material, printing paper, photosensitive paper, glossy paper, an OHT, a dielectric-coated paper, or the like) in an image forming process portion using an intermediate transfer system or a direct transfer system.

The image forming apparatus according to the present embodiment has two image formation modes, namely, a normal image formation mode which produces normal image density as a first image forming operation and a wide color gamut image formation mode which is capable of reproducing a wide color gamut image as a second image forming operation. The first image forming operation and the second image forming operation are controlled so as to be executable by a control portion. In the wide color gamut image formation mode, a peripheral velocity ratio between a photosensitive drum as an image bearing member and a developing roller as a developer bearing member or, in other words, a ratio of a peripheral velocity of the developing roller relative to a peripheral velocity of the photosensitive drum is varied with respect to the normal image formation mode. Therefore, the respective image formation modes differ from each other in the peripheral velocity ratio between the photosensitive drum and the developing roller.

(1) Configuration of Image Forming Apparatus

Figure 1:
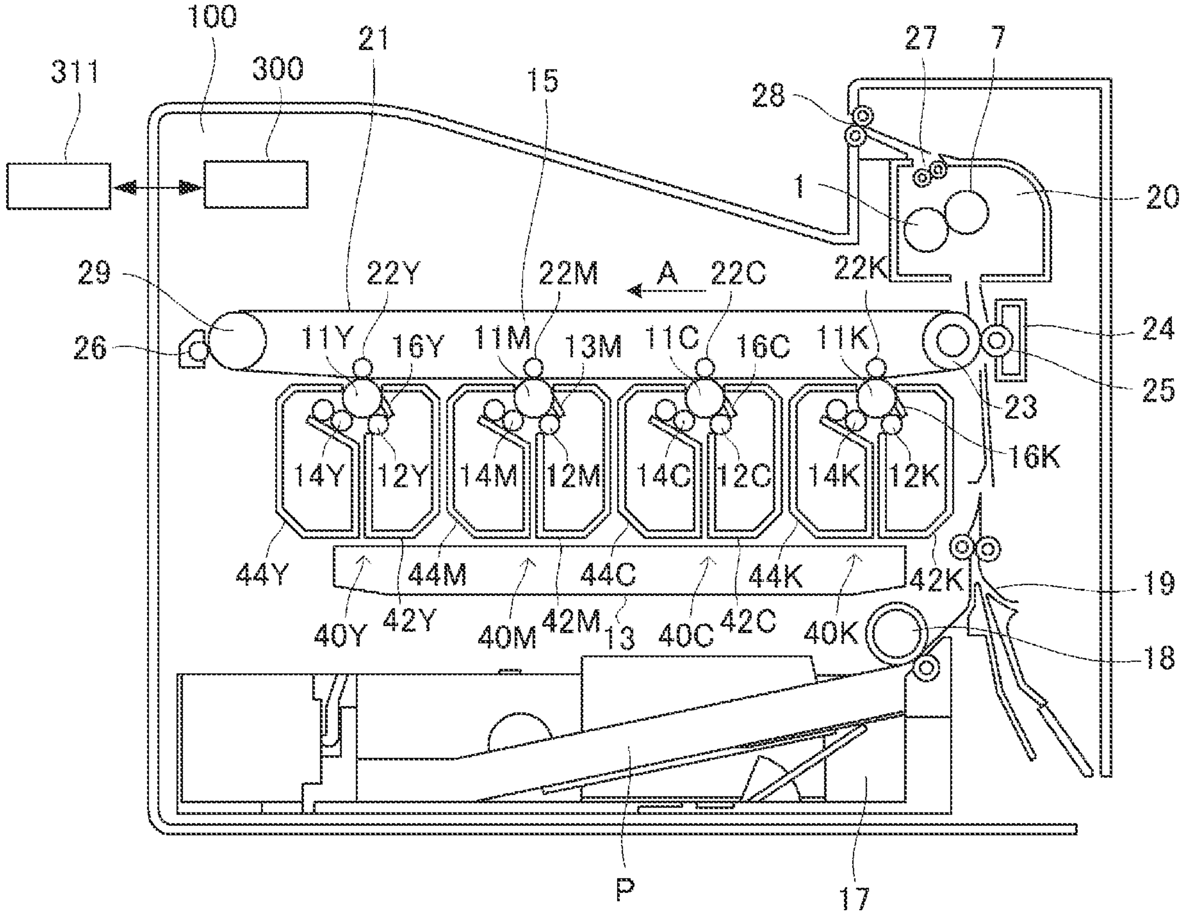
FIG. 1 is a schematic configuration diagram of an image forming apparatus according to a first embodiment.

FIG. 1 is a schematic sectional view of an image forming apparatus 100 according to the first embodiment of the present invention. The image forming apparatus 100 according to the present embodiment is a full-color laser printer adopting an in-line system and an intermediate transfer system. The image forming apparatus 100 is capable of forming a full-color image on a recording material in accordance with image information.

As a plurality of image forming portions, the image forming apparatus 100 includes first, second, third, and fourth image forming portions SY, SM, SC, and SK for respectively forming images of the colors yellow (Y), magenta (M), cyan (C), and black (Bk). In this case, each image forming portion (or image forming station) is constituted by a process cartridge 40 and a primary transfer roller 22 arranged on an opposite side via an intermediate transfer belt 21 as an intermediate transfer member. In addition, a scanner unit 13 (to be described later) is also a member that constitutes the image forming portion. The process cartridge 40 is constituted by a drum unit which includes a photosensitive drum 11, a cleaning blade 16, and a developer container 42; and a developing unit 44 (FIG. 7) which includes a developing roller 14, a supplying roller 34, and a stirring member 37. Configurations and operations of the first to fourth image forming portions are substantially the same with the exception of differences in colors of formed images. Therefore, unless the image forming portions must be distinguished from one another, the suffixes Y, M, C, and K or Bk that are added to the reference characters in order to represent which color is to be produced by which element in the respective drawings will be omitted and the image forming portions will be collectively described.

It should be noted that the photosensitive drums 11Y, 11M, and 11C in the present embodiment correspond to the second image bearing member according to the present invention and the photosensitive drum 11K in the present embodiment corresponds to the first image bearing member according to the present invention. In addition, the developing units 44Y, 44M, and 44C in the present embodiment correspond to the second developing unit (developing member) according to the present invention and the developing unit 44K in the present embodiment corresponds to the first developing unit (developing member) according to the present invention. Furthermore, the developing rollers 14Y, 14M, and 14C in the present embodiment correspond to the second developer bearing member according to the present invention and the developing roller 14K in the present embodiment corresponds to the first developer bearing member according to the present invention.

In addition, Y-LD, M-LD, and C-LD which irradiate light based on image data for forming Y, M, and C electrostatic latent images as second image data with respect to the photosensitive drums 11Y, 11M, and 11C correspond to the second light-emitting unit according to the present invention. Furthermore, K-LD which irradiates light based on image data for forming a K electrostatic latent image as first image data with respect to the photosensitive drum 11K in the scanner unit 13 corresponds to the first light-emitting unit according to the present invention. It should be noted that Y-LD to K-LD are laser diode units which are provided so as to respectively correspond to process cartridges 40Y to 40K and which irradiate laser beams, and are members that constitute the scanner unit 13. However, the use of laser diodes is not restrictive and an LED array provided with respect to each of the process cartridges 40Y to 40K may be used instead.

The photosensitive drum 11 is rotationally driven clockwise in FIG. 1 by driving unit (FIG. 7) provided in an image forming apparatus main body. A charging roller 12, the scanner unit 13, the developing roller 14, and the cleaning blade 16 are arranged in order around the photosensitive drum 11 along a rotation direction thereof. Furthermore, an intermediate transfer unit 15 is arranged for primarily transferring a toner image that is a developer image on the photosensitive drum 11 onto the intermediate transfer belt 21 which is an image bearing member opposing the photosensitive drum 11 and which acts as an endless belt. In addition, a secondary transfer portion 24 for secondarily transferring the toner image on the intermediate transfer belt 21 to a recording material P is arranged on a downstream side in a transport direction (a right side in FIG. 1) with respect to a primary transfer portion where the intermediate transfer unit 15 and the photosensitive drum 11 come into contact with each other. The intermediate transfer belt 21 circulatively moves in a direction of an arrow A in FIG. 1. Primary transfer rollers 22 for transferring a toner image on the photosensitive drums 11 to the intermediate transfer belt 21 are provided parallel to each other on an inner side of the intermediate transfer belt 21. Charges with positive polarity are applied from the primary transfer rollers 22 to the intermediate transfer belt 21, and toner images with negative polarity on the photosensitive drums 11 are primarily transferred onto the intermediate transfer belt 21. In addition, a secondary transfer roller 25 is arranged at a position opposing a driver roller 23 of the intermediate transfer unit 15. Charges with positive polarity are applied from the secondary transfer roller 25 to the recording material P having been transported to a secondary transfer portion, and primarily-transferred toner images with negative polarity on the intermediate transfer belt 21 are secondarily transferred. Accordingly, the toner images formed on the photosensitive drums 11 are transferred onto the recording material P. A cleaning apparatus 26 for removing unnecessary toner remaining on the intermediate transfer belt 21 after the secondary transfer is arranged at a position opposing a tension roller 29 of the intermediate transfer unit 15. Subsequently, the removed residual toner passes through a waste toner transport path (not illustrated) to be collected in a waste toner recovery container.

A feeding roller 18 feeds the recording material P in an uppermost portion of a feeding cassette 17 toward a resist roller pair 19. In addition, the resist roller pair 19 feeds the recording material P to the secondary transfer portion 24 in synchronization with an image write start position on the intermediate transfer belt 21.

A fixing unit 20 which acts as fixing unit fixes toner images of a plurality of colors having been transferred to the recording material P. The fixing unit 20 is constituted by a fixing roller 1 as a cylindrical rotating member that acts as a heat generating member on a side of an image formation surface and a pressure roller 7 as a pressing member that is pressing unit opposing the fixing roller 1. A pressure spring (not illustrated) causes the recording material P to be sandwiched by the fixing roller 1 and the pressure roller 7 and pressurizes the recording material P at prescribed pressure. The image formation surface side is heated and transported due to the fixing roller 1 being rotationally driven, a non-image formation surface side is pressurized by the pressure roller 7, and the toner images are melted to fix the toner images to the recording material P.

A discharge portion is constructed on a downstream side in the recording material transport direction of the fixing unit 20, a transporting roller pair 27 is provided in the discharge portion, and a discharge roller pair 28 is provided further downstream in a transfer material transport direction to discharge the recording material P to outside of the apparatus main body.

(2) Description of Image Forming Operation

Figure 2:
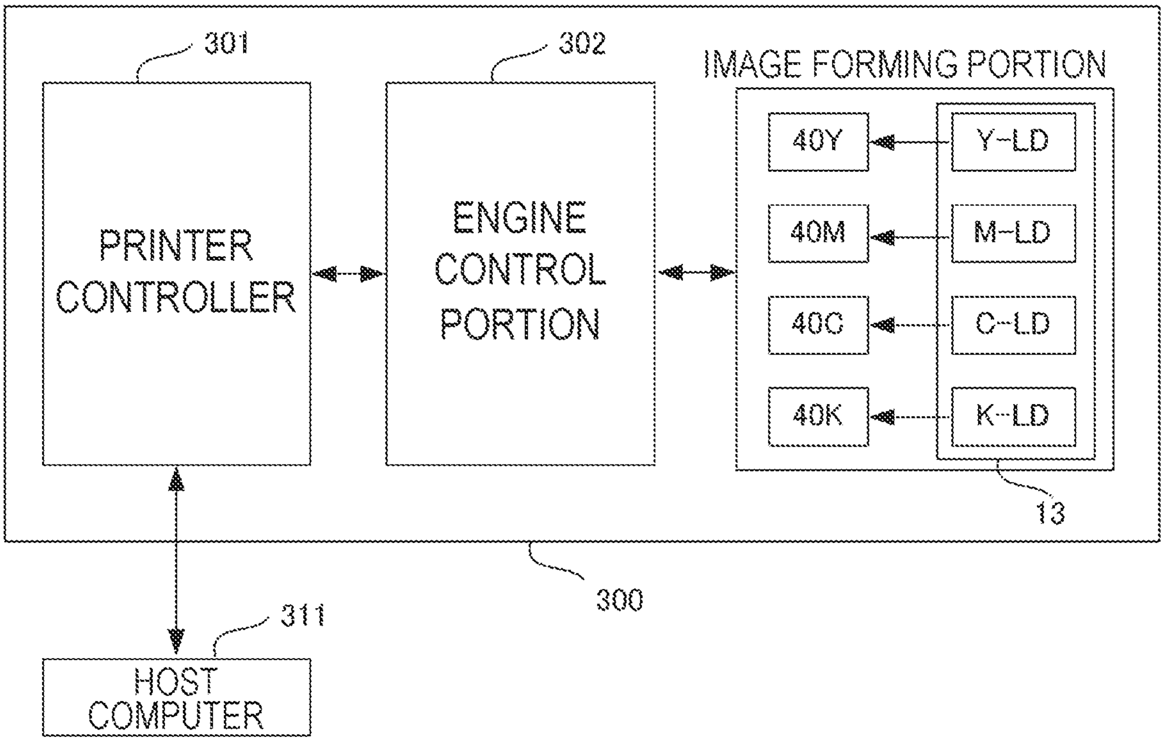
FIG. 2 is a block diagram showing a printer control portion of the image forming apparatus according to the first embodiment.

FIG. 2 is a block diagram showing a printer control portion 300 provided in the image forming apparatus according to the present embodiment. A printer controller 301 communicates with a host computer 311 and receives image data, expands the received image data into information that can be printed by a printer, and exchanges signals and performs serial communication with an engine control portion 302. The engine control portion 302 exchanges signals with the printer controller 301 and, furthermore, controls the image forming portion described earlier via serial communication. In other words, various operations including image forming operations in the image forming apparatus 100 are controlled by the engine control portion 302. As operations during image formation, the engine control portion 302 rotationally drives the photosensitive drum 11 clockwise in FIG. 1 in accordance with a received image formation timing and drives the scanner unit 13. During this process, a peripheral surface of the photosensitive drum 11 is subjected to a primary charging process by the charging roller 12 as charging unit. Subsequently, the scanner unit 13 as exposing unit forms an electrostatic latent image on the peripheral surface of the photosensitive drum 11, the developing roller 14 as developing unit transfers toner as a developer to a low potential portion of the electrostatic latent image, and forms toner images of the respective colors on the peripheral surface of the photosensitive drum 11. The formed toner images are transferred in a superimposed manner onto the intermediate transfer belt 21 by the primary transfer roller 22 while having image positions synchronized. At this point, once the toner images of all colors have been primarily transferred, an unfixed full-color toner image is formed on the intermediate transfer belt 21. Transfer residual toner that remains on each photosensitive drum 11 after primary transfer is removed by the cleaning blade 16 and stored in a storage portion inside the cleaning apparatus.

Subsequently, a leading end of the full-color toner image on the intermediate transfer belt 21 is rotationally transported to a point of opposition of the intermediate transfer belt 21 and the secondary transfer roller 25. At this timing, the resist roller pair 19 starts rotating and feeds the recording material P to the secondary transfer portion such that an image formation start position of the recording material P matches the leading end of the toner image on the intermediate transfer belt 21. In addition, due to a secondary transfer bias applied to the secondary transfer roller 25, the full-color toner image of the intermediate transfer belt 21 is transferred while the recording material P is being transported. Untransferred toner that remains on the intermediate transfer belt 21 is removed by the cleaning apparatus 26 and sent to and stored in a waste toner box (not illustrated).

Subsequently, the recording material P to which the full-color toner image has been transferred is transported from the secondary transfer portion to the fixing unit 20. After the toner image is heat-fixed to the recording material P in the fixing unit 20, the recording material P is discharged by the transporting roller pair 27 and the discharge roller pair 28 from the discharging portion to the outside of the apparatus main body in a state where the image formation surface faces downward.

Figure 7:
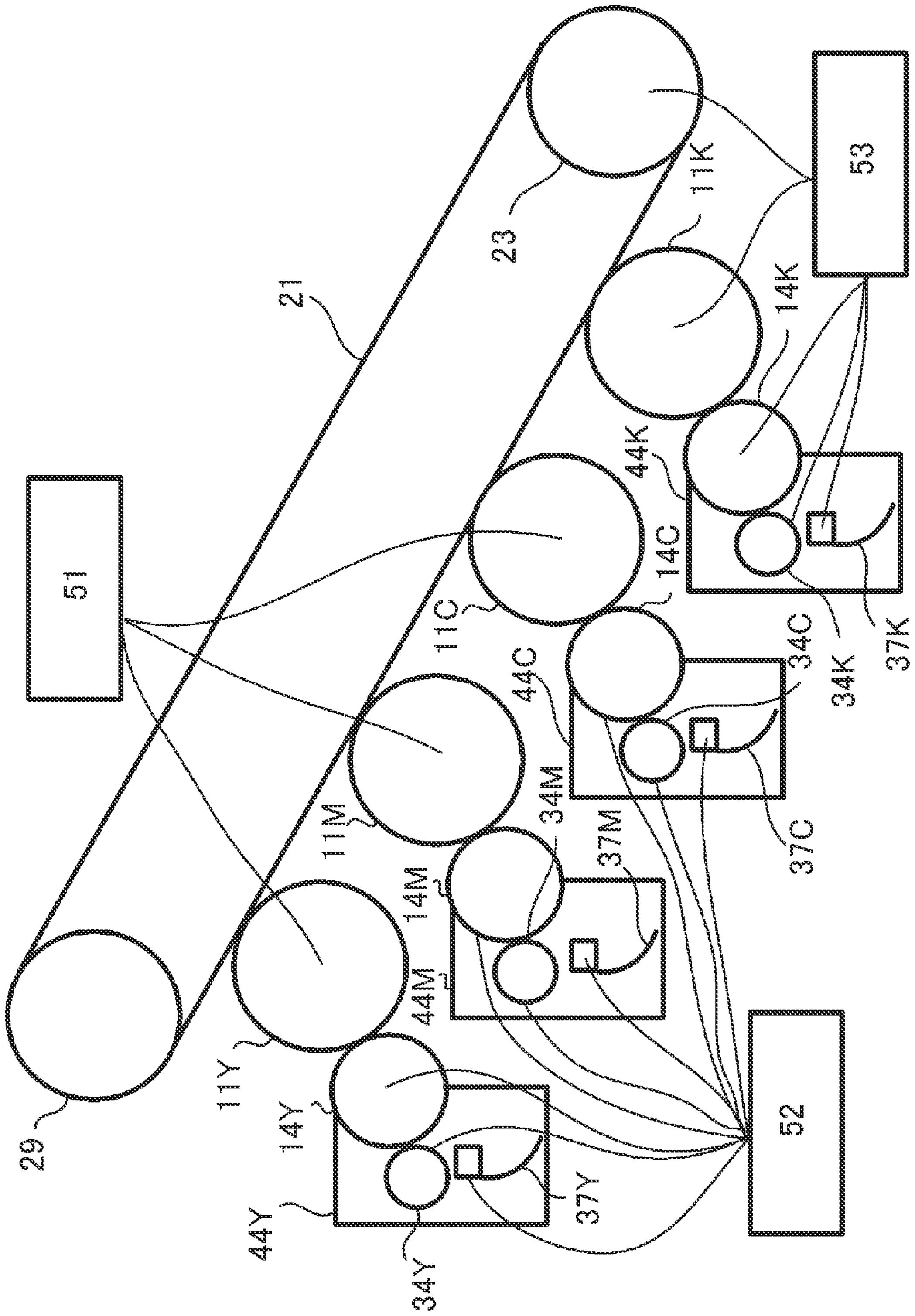
FIG. 7 is a schematic view of a drive connecting configuration according to the first embodiment.

As shown in FIG. 7, in the present embodiment, a configuration of driving unit which drives shafts of the photosensitive drum 11, the developing roller 14, the stirring member 37, and the supplying roller 34 differs from one process cartridge 40 to another. FIG. 7 is a schematic view showing a drive connecting configuration according to the first embodiment of the present invention.

The process cartridges of yellow (Y), magenta (M), and cyan (C) are configured as follows. Specifically, as shown in FIG. 7, a configuration is adopted where driving unit which rotationally drives the photosensitive drums 11Y, 11M, and 11C and driving unit which rotationally drives the developing rollers 14Y, 14M, and 14C respectively have different driving sources. The driving unit which rotationally drives the photosensitive drums 11Y, 11M, and 11C is constituted by a drive motor 51 as a first driving source, a gear train which transmits a rotational driving force of the drive motor 51, and the like. On the other hand, the driving unit which rotationally drives the developing rollers 14Y, 14M, and 14C is constituted by a drive motor 52 as a second driving source, a gear train which transmits a rotational driving force of the drive motor 52, and the like. It should be noted that the drive motor 52 also constitutes driving unit which, together with another gear train, rotationally drives rotating shafts of the stirring members 37Y, 37M, and 37C. In addition, the drive motor 52 also constitutes driving unit which, together with yet another gear train, rotationally drives the supplying rollers 34Y, 34M, and 34C.

In the process cartridge 40K of black (K), driving unit which rotationally drives the photosensitive drum 11K, driving unit which rotationally drives the developing roller 14K, and driving unit which rotationally drives the supplying roller 34K are constituted by a single shared drive motor 53 as a third driving source. In addition, the drive motor 53 constitutes driving unit which, together with another gear train, rotationally drives a rotating shaft of the stirring member 37K and also constitutes driving unit which, together with yet another gear train, rotationally drives the driver roller 23 that circulatively moves the intermediate transfer belt 21. The various drive motors and gear trains described above correspond to driving units capable of individually variably rotationally driving an image bearing member, a developer bearing member, a supplying member, and a transporting member according to the present invention and are controlled by the engine control portion 302 as a control portion.

Conventionally, a photosensitive drum and a developing roller are driven via a gear train by a same driving source (drive motor). Therefore, a peripheral velocity ratio between the photosensitive drum and the developing roller is uniquely determined in a fixed manner by a gear ratio. In contrast, in the present embodiment, since the YMC cartridges are configured such that the photosensitive drum and the developing roller are driven by different driving sources, the peripheral velocity ratio between the photosensitive drum and the developing roller can be made variable.

(3) Normal Image Formation Mode and Wide Color Gamut Image Formation Mode

The image forming apparatus according to the present embodiment is configured such that the photosensitive drum 11 and the developing roller 14 of the respective colors can be driven at an individual number of revolutions by the driving unit configured as described above. Taking advantage of this configuration, the image forming apparatus according to the present embodiment has two image formation modes, namely, a normal image formation mode (image formation mode 1) which produces normal image density and a wide color gamut image formation mode (image formation mode 2) which is capable of reproducing a wide color gamut image by varying the peripheral velocity ratio between the photosensitive drum 11 and the developing roller 14. The respective image formation modes are conditions that differ in a rotational speed ratio (peripheral velocity ratio) between the photosensitive drum 11 and the developing roller 14, and each speed is as listed in Table 1. With respect to a designated color, the peripheral velocity ratio is set higher in the wide color gamut mode than in the normal mode, and a rotating operation of the photosensitive drum 11 and the developing roller 14 at the peripheral velocity ratio set high corresponds to an operation for increasing developer supply capability.

In addition, development contrasts such as those shown in (B) in Table 1 can be variably set for each mode and each color by various bias applying configurations to be described later with reference to FIG. 9. An operation for making a development contrast variable also corresponds to an operation for increasing developer supply capability.

TABLE 1

(A)

| Process speed (mm/s) | Intermediate transfer belt and recording material | Photosensitive drum | Developing roller | Peripheral velocity ratio |
|---|---|---|---|---|
| Normal mode | 214 | 214 | 310 | 145% |
| Wide color gamut mode (designated color) | 71 | 71 | 164 | 230% |
| Wide color gamut mode (non-designated color) | 71 | 71 | 103 | 145% |

TABLE 1-continued

| (B) | | | | |
|---|---|---|---|---|
| Latent image setting (−V) | Dark-part potential (Vd) | Light-part potential (Vl) | Developing bias (Vdev) | Development contrast (Vdev − Vl) |
| Normal mode | 450 | 80 | 325 | 245 |
| Wide color gamut mode (designated color) | 760 | 90 | 590 | 500 |
| Wide color gamut mode (non-designated color) | 450 | 80 | 325 | 245 |

As is shown in (A) in Table 1, in the wide color gamut image formation mode (designated color), the peripheral velocity ratio is set high for the purpose of increasing a toner supply amount per unit time from the developing roller 14 with respect to the photosensitive drum 11 as compared to the normal image formation mode. A ratio between modes of the peripheral velocity ratio is set such that the wide color gamut image formation mode is 1.59 times (=230%/145%) the normal image formation mode. It should be noted that a manner in which the peripheral velocity ratio is varied is not limited to the above. For example, a configuration may be adopted in which the peripheral velocity ratio can be varied by increasing a linear speed of the developing roller 14 while keeping the linear speed of the photosensitive drum 11 fixed.

In addition, as a setting in which all of the toner supplied from the developing roller 14 is developed on the photosensitive drum, a development contrast (an absolute value of a difference between a developing bias and a light-part potential) in the wide color gamut mode (designated color) is made higher than that during the normal mode. In other words, the normal image formation mode is a mode in which a charging bias V is set to −1100 V, Vd is set to −500 V, VI is set to −100 V, and the developing bias is set to −300 V. The wide color gamut image formation mode is a high definition print mode in which the charging bias V is set to −1600 V, Vd is set to −800 V, VI is set to −100 V, and the developing bias is set to −600 V. Moreover, depending on the bias applying configuration, there are cases where the development contrast in the wide color gamut mode (non-designated color) can be set to the same development contrast as a designated color. In such a case, the development contrast setting of the non-designated color is not limited to (B) in Table 1. In the wide color gamut image formation mode, since the potential difference (absolute value) between the dark-part potential Vd and the light-part potential VI is large, reproducibility of fine lines can be improved. As described above, in the present embodiment, a plurality of modes with mutually different potential differences of an electrostatic latent image (in other words, the potential differences between a light-part potential and a dark-part potential) can be set as image formation modes.

Figure 9:
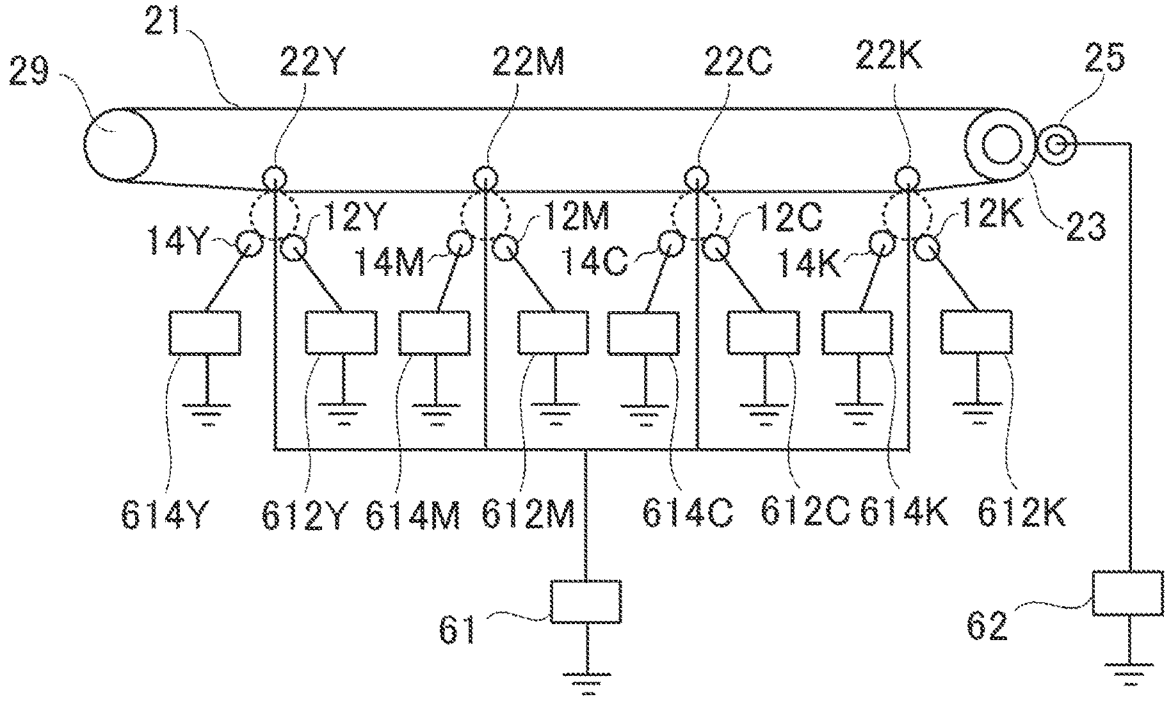
FIG. 9 is a schematic view of a bias applying configuration according to the first embodiment.

FIG. 9 is a schematic view showing various bias applying configurations in the image forming apparatus according to the present embodiment. As shown in FIG. 9, in each image forming portion, a charging bias is applied to the charging roller 12 from a charging bias applying portion 612 including a high-voltage power supply and a developing bias is applied to the developing roller 14 from a developing bias applying portion 614 including a high-voltage power supply. In addition, in each image forming portion, a primary transfer bias is applied to the primary transfer roller 22 that is a primary transfer member from a common primary transfer bias applying portion 61 as first applying unit including a high-voltage power supply. Alternatively, a configuration may be adopted in which a primary transfer bias applying portion is individually provided for each image forming portion. Furthermore, a secondary transfer bias is applied to the secondary transfer roller 25 that is a secondary transfer member from a secondary transfer bias applying portion 62 as second applying unit including a high-voltage power supply. Alternatively, a configuration may be adopted in which each primary transfer bias applying portion is eliminated and primary transfer is performed in each primary transfer portion by applying a primary transfer bias to each primary transfer portion via the intermediate transfer belt 21 due to bias application by the secondary transfer bias applying portion 62. The various bias applying configurations are controlled by the engine control portion 302.

TABLE 2

| Target transfer current (μA) | Primary transfer portion | Secondary transfer portion |
|---|---|---|
| Normal mode | 10 | 30 |
| Wide color gamut mode | 8.5 | 14 |

Table 2 compiles transfer conditions of the respective modes. When viewed in combination with Table 1, it is shown that, in the wide color gamut mode, a target transfer current is set equal to or higher than a speed ratio despite process speeds of the intermediate transfer belt 21 and the recording material P being ⅓ with respect to the normal mode. This is because a toner image borne by the photosensitive drum 11 and the intermediate transfer belt 21 longer than in the normal mode is transferred at each transfer portion. A more detailed description will be given with reference to equation 1 below. Equation 1 is an equation representing a transfer current amount It necessary for transferring a toner image with a width W and having a certain charge per unit area at a prescribed process speed PS. According to this equation, since a total charge amount Q increases by an amount of toner having been increased in the wide color gamut mode, even if the process speed is reduced to ⅓, it can be described that a transfer current that is equal to or larger than ⅓ of a transfer current in the normal mode is required.

$$It = Q/M \times M/S \times PS \times W = Q/S \times PS \times W \qquad \text{(Equation 1)}$$

where

It: necessary transfer current amount

Q/M: charge amount (so-called triboelectricity) per unit weight of developer

M/S: developer weight per unit area

PS: process speed

W: image width

Q/S: toner charge amount per unit area

Heretofore, the difference between the normal mode and the wide color gamut mode has been described.

(4) Wide Color Gamut Image Formation Mode Limited to Designated Color

Hereinafter, a wide color gamut mode limited to a designated color will be described. As already described above in the Description of the Related Art, applying the wide color gamut mode to all colors does not always suit a user's needs. For example, Bk toner is often mainly used for reproducing characters. While the wide color gamut mode is effective when producing color depth (L* reduction), since an amount of consumption of Bk is larger than those of other colors, cases that are undesirable from the perspective of an amount of color material consumption may also arise. From the reasons described above, the image forming apparatus according to the present embodiment includes a wide color gamut image formation mode limited to a designated color in which Bk is excluded from an image formation condition of the wide color gamut mode even during the wide color gamut mode and only the other designated colors of Y, M, and C as second colors are subjected to the wide color gamut mode. More specifically, with respect to Bk that is a wide color gamut mode non-designated color as a first color, as shown in Table 1 (A) described earlier, the peripheral velocity ratio of the developing roller 14 relative to the photosensitive drum 11 is the same as in the normal mode. Due to this setting, the number of revolutions of the developing roller can be suppressed as compared to the designated colors and consumption of lifetime can be prevented from being unnecessarily promoted.

As a method of operating the wide color gamut mode limited to a designated color, for example, a method of providing a switch for enabling/disabling a function thereof on a printer driver (not illustrated) which sends an operation instruction from the host computer 311 to the printer controller 301 may be adopted.

(5) Problem when Applying Wide Color Gamut Mode Limited to Designated Color (5-1) Basic Characteristics of Transfer Process Before describing the problem in specific terms, basic characteristics of the transfer process will be described. First, a weak drop and a strong drop will be described. A weak drop and a strong drop refer to portions other than a transfer effective region in a transfer characteristic curve and are both transfer failures representing a drop in transfer efficiency. A drop in transfer efficiency in an insufficient charge region is called a weak drop and a drop in transfer efficiency in an excessive charge region is called a strong drop. In addition, a re-transfer refers to a phenomenon in which toner transferred onto the intermediate transfer belt 21 at an upstream image forming unit in the primary transfer portion returns to the photosensitive drum 11 at a downstream image forming unit and which results in a reduction in a toner amount on the intermediate transfer belt 21.

Figure 3:
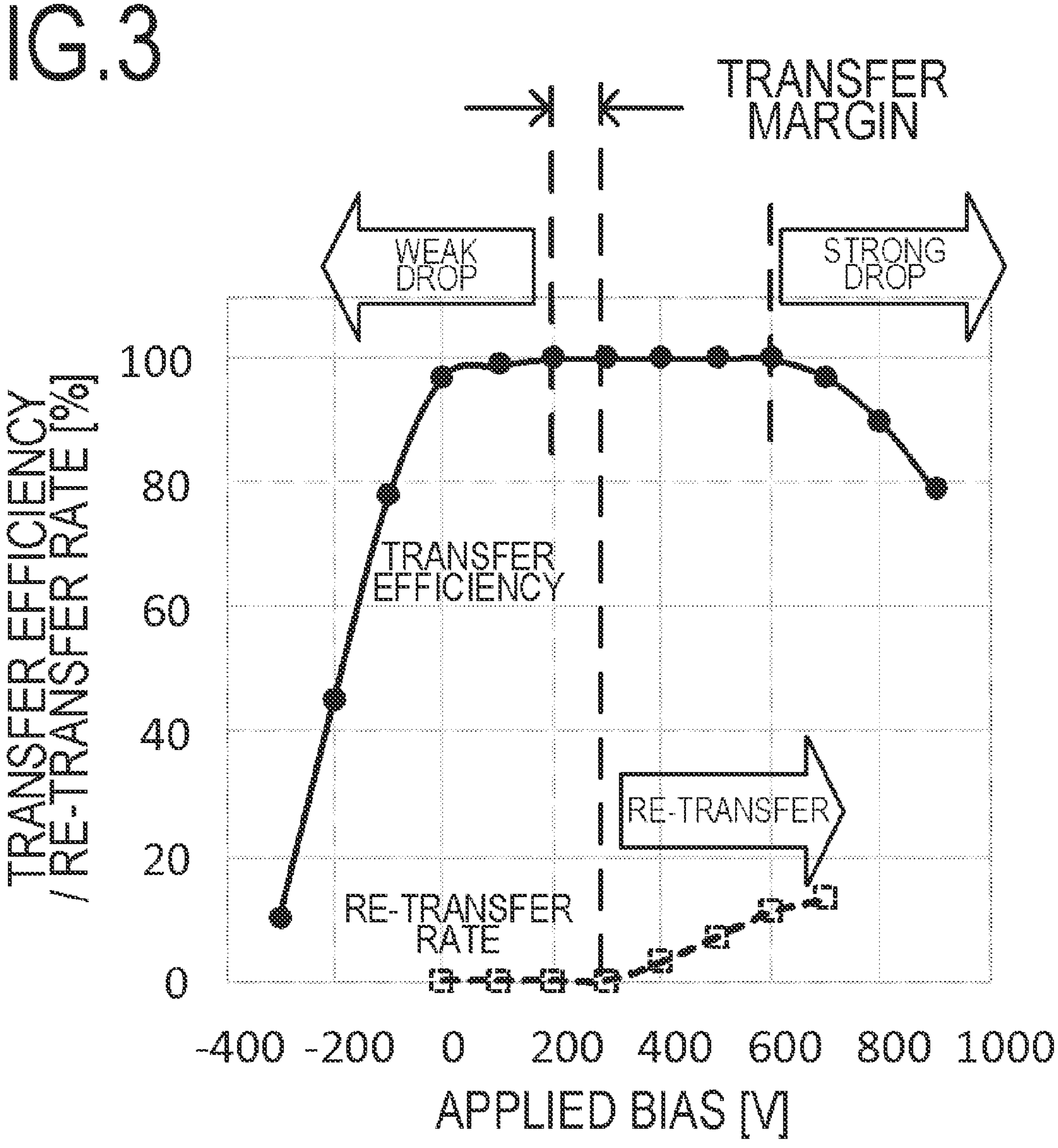
FIG. 3 is a primary transfer characteristic curve of the image forming apparatus according to the first embodiment.

FIG. 3 shows a primary transfer characteristic curve of the image forming apparatus according to the present embodiment. An abscissa represents an applied bias, an ordinate represents a transfer efficiency or a re-transfer rate, a solid line indicates transfer efficiency characteristics, and a dash line indicates re-transfer characteristics. In FIG. 3, the transfer efficiency rises until an applied bias of 200 (V), saturates between 200 to 600 (V), and drops from 600 (V). A transfer failure that occurs at or below 200 (V) is referred to as a weak drop and a transfer failure that occurs at or above 600 (V) is referred to as a strong drop. In addition, a rise in the re-transfer rate that occurs at or above 300 (V) is referred to as a re-transfer. Usually, the applied bias is set in a transfer margin region which enables stable density to be obtained in consideration of a balance among a weak drop, a strong drop, and re-transfer.

(5-2) Weak Drop Generation Mechanism

This is a state where toner on the photosensitive drum 11 is moved to the intermediate transfer belt 21 and, at the same time, a sufficient charge for supplying a bearing charge of the toner to the intermediate transfer belt 21 is not present. As a result, the toner ends up remaining on the photosensitive drum 11.

(5-3) Strong Drop/Re-Transfer Generation Mechanism

When an applied bias is increased, a transfer current eventually exceeds an amount required for toner transfer. The overcurrent flows as a discharge between the photosensitive drum 11 and the intermediate transfer belt 21 and has an effect of varying toner triboelectricity (Q/M). The triboelectricity of toner having entered a physical nip formed by the photosensitive drum 11 and the intermediate transfer belt 21 drops to zero due to the discharge inside the physical nip. Forces acting on the toner no longer subject to an electrostatic force are reduced to only a non-electrostatic attachment force, and approximately half of the toner remains adsorbed on the photosensitive drum 11. This state is a strong drop. The untransferred toner is reversed to positive by a discharge immediately after exiting the physical nip. Therefore, due to the strong drop, a large portion of the toner triboelectricity remaining on the photosensitive drum is observed as a positively reversed state. Since a change in triboelectricity in the nip is dependent on a discharge amount between the photosensitive drum 11 and the intermediate transfer belt 21, the strong drop worsens as the applied bias and a latent image contrast (a difference between an exposed portion potential and a dark-part potential) increase.

A re-transfer can be described in a similar manner to a strong drop. When multi-transferring toner onto the intermediate transfer belt 21 during a primary transfer process, a monochrome image on the intermediate transfer belt 21 having been transferred at an upstream portion image forming unit passes a transfer nip of a downstream image forming unit. Since a surface of the photosensitive drum opposing the monochrome image portion at this point has a dark-part potential, the transfer contrast in the portion exceeds a transfer contrast that is optimal for primary transfer. Therefore, in the monochrome image portion, a discharge inside the nip occurs between the photosensitive drum and the intermediate transfer belt. This is the mechanism of re-transfer. As a result, the toner triboelectricity of secondary and higher-order colors on the intermediate transfer belt after being multi-transferred is smaller than the toner triboelectricity of a monochrome.

(5-4) Problem when Applying Wide Color Gamut Mode Limited to Designated Color

Table 3 represents results of a secondary transfer target current It at each process speed calculated according to (Equation 1) based on results of measurements of a weight and a charge amount of the developer on the recording material P in the normal mode and in the wide color gamut mode in the image forming apparatus according to the present embodiment (premised on an image width W of 297 mm). As is apparent from the table, M/S of the monochrome (designated color) and the multicolor (designated color) in the wide color gamut mode has increased as compared to the normal mode (the value of the multicolor in this case is a value of a maximum toner amount after multi-transfer). In addition, as described above, the toner triboelectricity of secondary and higher-order colors after multi-transfer is smaller than the toner triboelectricity of monochrome and a result consistent with the basic characteristics of the transfer process described earlier is obtained. Toner triboelectricity Q/M was measured using E-spart Analyzer EST-G, a charge amount/particle size distribution measuring instrument manufactured by HOSOKAWA MICRON CORPORATION.

TABLE 3

| Image formation mode | Measurement value on recording material → | M/S [mg/cm2] | Q/M [μC/g] | Q/S [μC/cm2] | PS [mm/s] | It [μA] |
|---|---|---|---|---|---|---|
| Normal mode | Monochrome | 0.45 | 56 | 25200 | 214 | 16.0 |
| | Multicolor | 0.90 | 40 | 36000 | 214 | 22.9 |
| Wide color gamut mode | Monochrome (non-designated color) | 0.45 | 56 | 25200 | 71 | 5.3 |
| | Monochrome (designated color) | 0.70 | 44 | 30800 | 71 | 6.5 |
| | Multicolor (designated color) | 1.40 | 30 | 42000 | 71 | 8.9 |

Figure 4:
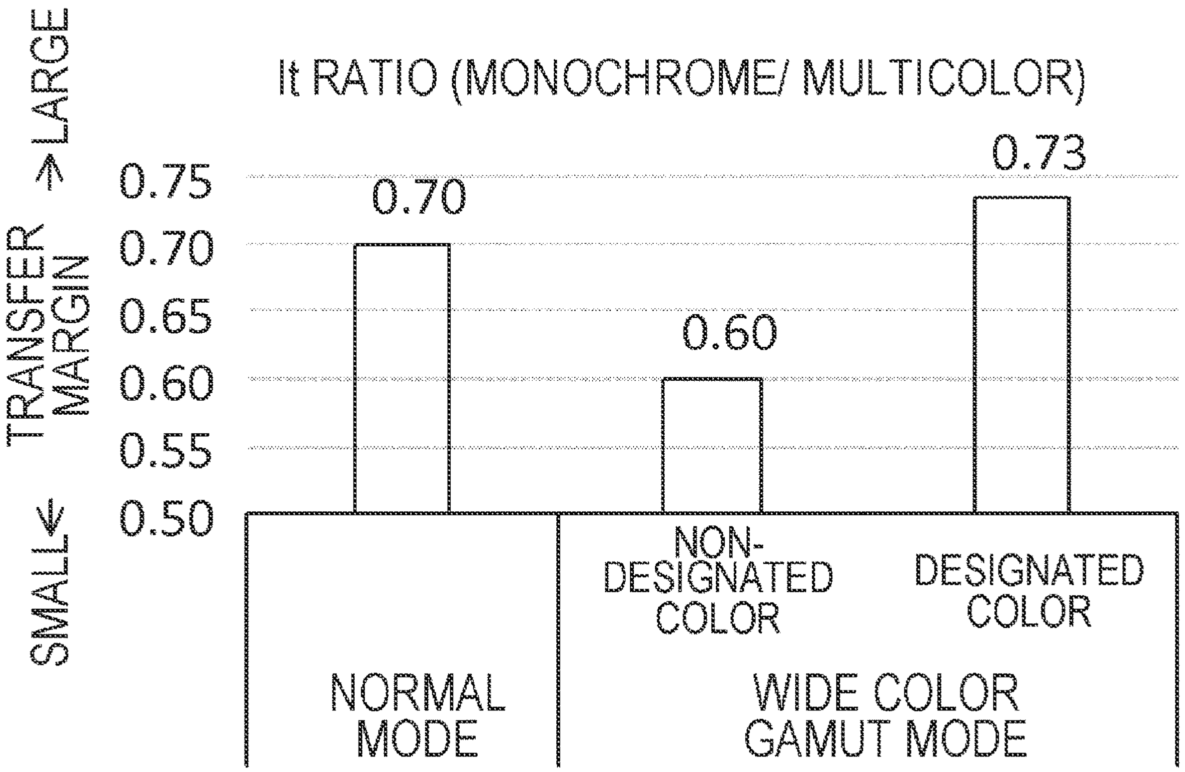
FIG. 4 is a diagram representing a ratio of a secondary transfer required current of monochrome relative to multicolor according to the first embodiment.

FIG. 4 represents a result of a compilation of a ratio (It ratio) of a secondary transfer required current of monochrome relative to multicolor using the results shown in Table 3. The It ratio is an indicator that indicates how much a required current value optimal for transferring a monochrome deviates from a required current value optimal for transferring a multicolor. The closer the value is to 1, the closer the required current values of multicolor and monochrome are to each other, which means that an overcurrent is less likely to flow in excess of an amount necessary for toner transfer of a monochrome and a state exists where a transfer margin is present. When the value is small, a monochrome becomes a strong drop/re-transfer region in which an overcurrent flows under a current necessary for transferring a multicolor, density on the recording material declines, and the transfer margin is reduced (refer to FIG. 3).

As shown in FIG. 4, the It ratio for a non-designated color (in the present embodiment, Bk) in the wide color gamut mode is smaller than the It ratio in the normal mode. In other words, with respect to a color (in the present embodiment, Bk) to which the wide color gamut mode is not applied, since an electric field intensity that is higher than necessary is imparted at the transfer portion, a charge of the developer is reversed and transfer efficiency deteriorates to cause density to become lower than during the normal mode.

Figure 5:
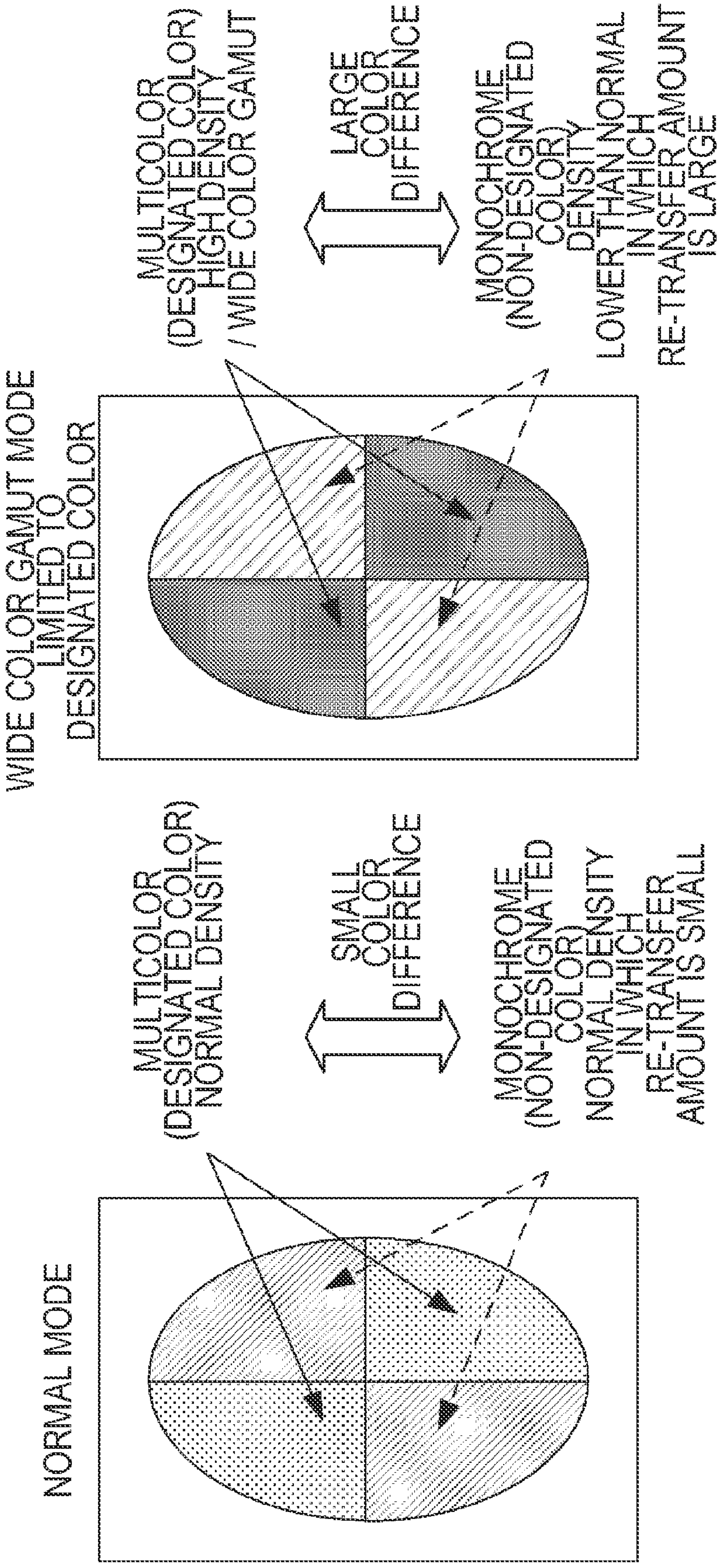
FIG. 5 is an explanatory diagram of a problem that becomes visible on an image when a wide color gamut mode limited to a designated color is applied.

FIG. 5 is a simplified diagram for explaining a problem that becomes visible on an image when a wide color gamut mode limited to a designated color is applied. In the wide color gamut mode limited to a designated color on a right side of the diagram, while a multicolor (designated color) which is the designated color of the wide color gamut mode has a wide color gamut, density becomes lower than during the normal mode with respect to a monochrome (non-designated color) which is a color not designated for a wide color gamut. Therefore, colors including the designated color are highly chromogenic while colors solely made up of colors other than the designated color have low chromogenicity and, in some cases, a color difference between colors in a single image became more apparent than when printing in the normal mode shown on a left side of the diagram.

(6) Method of Reducing Color Difference and Difference in Image Quality Between Designated Color and Non-Designated Color of Wide Color Gamut (Description of Advantageous Effect of Present Embodiment)

Hereinafter, an advantageous effect of the present embodiment will be described. According to the calculation formula (Equation 1) of a required transfer current value described above, the required transfer current value is only dependent on Q/S (charge amount per unit area) when process speed and image width are the same. Therefore, approximating the Q/S of a non-designated color to the Q/S of the designated color results in improving a transfer margin. In consideration thereof, the image forming apparatus according to the present embodiment approximates (increasing) the Q/S of a non-designated color to the Q/S of the designated color in order to solve the problem by multi-transferring another color for a monochrome non-designated color or by replacing the monochrome non-designated color with another color within a range where color difference is equal to or smaller than a prescribed value.

In addition to being formed solely by a Bk toner image, a black image portion in an image formed on a recording material (a region represented by black in the image on the recording material) can also be formed by superimposing (mixing) toners of the three colors Y, M, and C other than Bk at a prescribed ratio. A UCR (Under Cover Removal) process is known which utilizes this property to replace a black portion and/or a gray portion of an image formed by the three colors of Y, M, and C with Bk. In the present embodiment, a black image portion formed solely by Bk toner in the normal mode is formed in the wide color gamut mode by (i) overlaying the toners of the three colors of Y, M, and C on Bk or (ii) only using the toners of the three colors of Y, M, and C without using Bk. Specifically, (i) image data of Y, M, and C as a second color corresponding to a black image portion that is an image portion indicated by image data of Bk as first image data is added to image data of Y, M, and C as second image data. Alternatively, (ii) at least a part of image data of Bk as first image data is replaced by image data of a plurality of colors constituting Y, M, and C as a second color corresponding to a black image portion that is an image portion indicated by image data of Bk.

Figure 8:
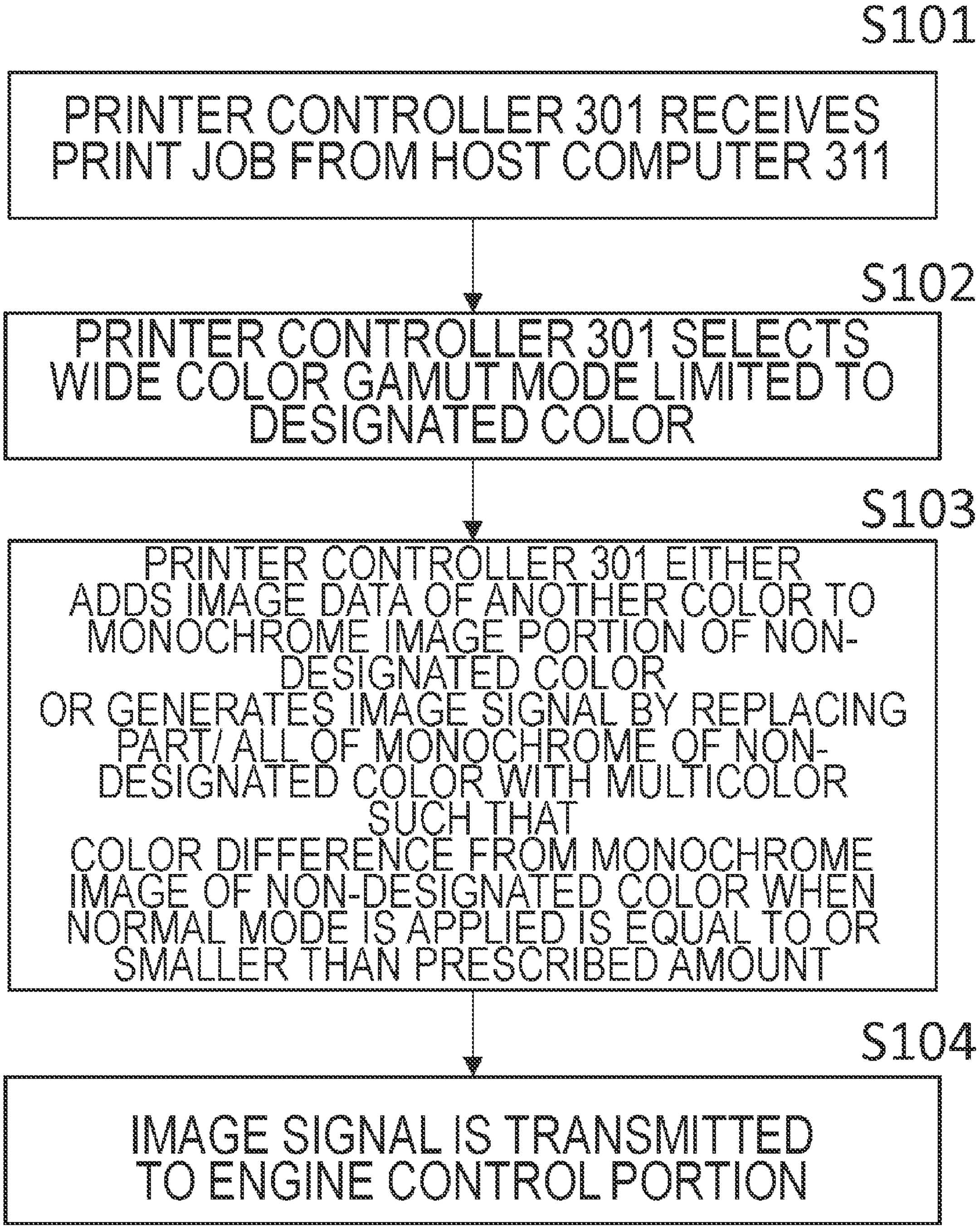
FIG. 8 is a flow chart of a control flow according to the first embodiment.

FIG. 8 shows a specific control flow. First, the printer controller 301 receives data of a print job from the host computer 311 (S101).

Based on the received data of the print job, the printer controller 301 makes a determination in accordance with, for example, a print command from a user or contents of image data, and selects a wide color gamut mode limited to a designated color (S102).

In step S103, the printer controller 301 applies a process to the received image data. The printer controller 301 executes a process of adding image data with respect to the image data of Y, M, and C among the four pieces of received color separation image data of Y, M, C, and Bk. More specifically, an image portion that is the same as or similar to a black image portion indicated by Bk is generated by the respective pieces of image data of Y, M, and C and added to the image data (image signal) of the respective colors. The printer controller 301 generates the image data of the respective colors such that the respective pieces of image data of Y, M, and C are formed on a recording medium at a prescribed toner ratio (S103).

While the ratios at which the toners of Y, M, and C are overlaid on the black image portion are set to Y: 15%, M: 30%, and C: 30% in the present embodiment, these ratios are not restrictive. For example, Y, M, and C may all be set to 30% or only a part of the colors of Y, M, and C may be used (all of the colors need not be overlaid). Alternatively, the printer controller 301 may generate four pieces of color separation image data of Y, M, C, and Bk having been converted such that the black image portion is formed only by the toners of the three colors of Y, M, and C without using Bk (S103). In short, any ratio can be appropriately adopted as long as the ratio is capable of keeping a color difference between a monochrome image of the non-designated color (Bk) and the designated color when the normal mode is being applied to or below a prescribed amount or, in other words, within a prescribed allowable range. As data generating unit (generator), the printer controller 301 transmits image data generated as described above to the engine control portion 302 (S104), and the engine control portion 302 controls each image forming portion based on the received image data and forms an image.

It should be noted that "%" with respect to Y, M, C, and Bk in the foregoing description, Tables 4 and 6 presented below, and the like indicates a ratio in the 256 levels (gradation values 0 to 255) of the corresponding color. For example, C being "30%" means that the gradation value of C is "76".

TABLE 4

| | Difference of non-designated color (Bk) from normal mode | | |
|---|---|---|---|
| | Color | Density | ΔE (relative to normal mode) |
| Normal mode | Bk 100% | 1.59 | |
| Wide color gamut mode limited to designated color (comparative conventional example) | Bk 100% | 1.43 | 4.4 |
| Wide color gamut mode limited to designated color (1st embodiment) | Bk 100%, C 30%, M 30%, Y 15% | 1.61 | 1.4 |

| | Difference of designated color (C, M, and Y) from normal mode | |
|---|---|---|
| | Color | C* |
| Normal mode | Green (C 100%, Y 100%) | 69 |
| Wide color gamut mode limited to designated color (1st embodiment) | Green (C 100%, Y 100%) | 75 |
| Normal mode | Red (M 100%, Y 100%) | 79 |
| Wide color gamut mode limited to designated color (1st embodiment) | Red (M 100%, Y 100%) | 84 |

Table 4 represents results of a comparative experiment performed using the image forming apparatus according to the present embodiment and a comparative object example with respect to densities of a designated color monochrome and a non-designated color multicolor in the wide color gamut mode and a color difference between the two colors. Highly-white paper GF-C081 (81.4 g/m2) manufactured by Canon Inc. was used as the recording material and chromaticity and density were measured using Spectrolino (Backing Black) manufactured by X-Rite, Incorporated.

Table 4 reveals the following.

As a difference of the non-designated color (Bk) from the normal mode, in the comparative conventional example which uses Bk 100% as-is even in the wide color gamut mode limited to a designated color, density is lower than Bk 100% in the normal mode. This is due to a decline in transfer efficiency.

On the other hand, adding C 30%, M 30%, and Y 15% to Bk 100% according to the present embodiment enables the color difference from the normal mode Bk 100% to be set to 1.4 which is equal to or smaller than a color difference ΔE* 0.8 to 1.6 that is an AA-grade tolerance (JIS Z8721). In addition, it was confirmed that a similar result (equal to or smaller than the color difference ΔE* 0.8 to 1.6) is obtained when C 30%, M 30%, and Y 30% or when only a part of the colors of Y, M, and C is used as an additional color.

At the same time, taking multicolors (green and red) created with the designated colors (C, M, and Y) as an example, chroma C* of each multicolor is larger than in the normal mode and a wide color gamut is realized.

Now note that, in above explained process of S103, the table for converting the RGB data for the wide color gamut mode to the CMYK data may be previously prepared and be used when the RGB data is input to the printer controller 301 from the outside of the apparatus. In addition, the conversion table for the normal mode may also be previously prepared. Both of the tables may be stored in the memory of the printer controller 301. Thus, the printer controller 301 switches the table to be used depending on the image forming mode being selected in the print job.

In the table for the wide color gamut mode, when the image with the RGB value being recognized as gray or black is input to the printer controller 301, the proportion of the CMY value in the gray or black image may be greater than the proportion of K value in the gray or black image, and the ratio of the proportion of the CMY value to the proportion of the K value in the table for the wide color gamut mode may be higher than that in the table for the normal mode. Therefore, the table for the wide color gamut mode outputs the converted image data in which the ratio of the proportion of the CMY value to the proportion of K value is more increased than in the normal image forming mode. After the image data converted by the table is output, the same process as in S104 is performed by the printer controller 301.

As described above, according to the present embodiment, in an image forming apparatus having a print condition in which a designated color to which a wide color gamut mode is applied and a non-designated color to which the wide color gamut mode is not applied coexist, a color difference and a difference in image quality between the designated color and the non-designated color of the wide color gamut can be reduced. In addition, an image forming apparatus which prevents consumption of lifetime of a non-designated color from being unnecessarily promoted while exhibiting an original color gamut-enlarging effect can be provided.

Second Embodiment

In a second embodiment of the present invention, an apparatus which reduces a color difference and a difference in image quality between the designated color and the non-designated color of the wide color gamut by means that differ from the first embodiment will be described. Specifically, in the second embodiment, with respect to a non-designated color in the wide color gamut mode limited to a designated color, a toner with a smaller average particle size than the designated color is used to increase monochrome density when a same toner amount (M/S) is borne. Reducing the average toner particle size is also advantageous in that fine images such as delicate lines and delicate characters can be formed in high image quality. This is particularly effective with respect to Bk. It should be noted that the image forming apparatus according to the second embodiment excludes C and Bk from an image formation condition of a wide color gamut mode even during the wide color gamut mode and the wide color gamut image is limited to the other colors Y and M as designated colors. In other words, a main body configuration is adopted in advance in which, with respect to C and Bk, a peripheral velocity ratio of the developing roller relative to the photosensitive drum cannot be changed. While Y, M, and C are the wide color gamut mode designated colors (second color) and Bk is a wide color gamut mode non-designated color (first color) in the first embodiment, Y and M are the wide color gamut mode designated colors (second color) and Bk and C are the wide color gamut mode non-designated colors (first color) in the second embodiment. In other words, in the present embodiment, the wide color gamut mode non-designated color (first color) is constituted by a plurality of colors.

Figure 10:
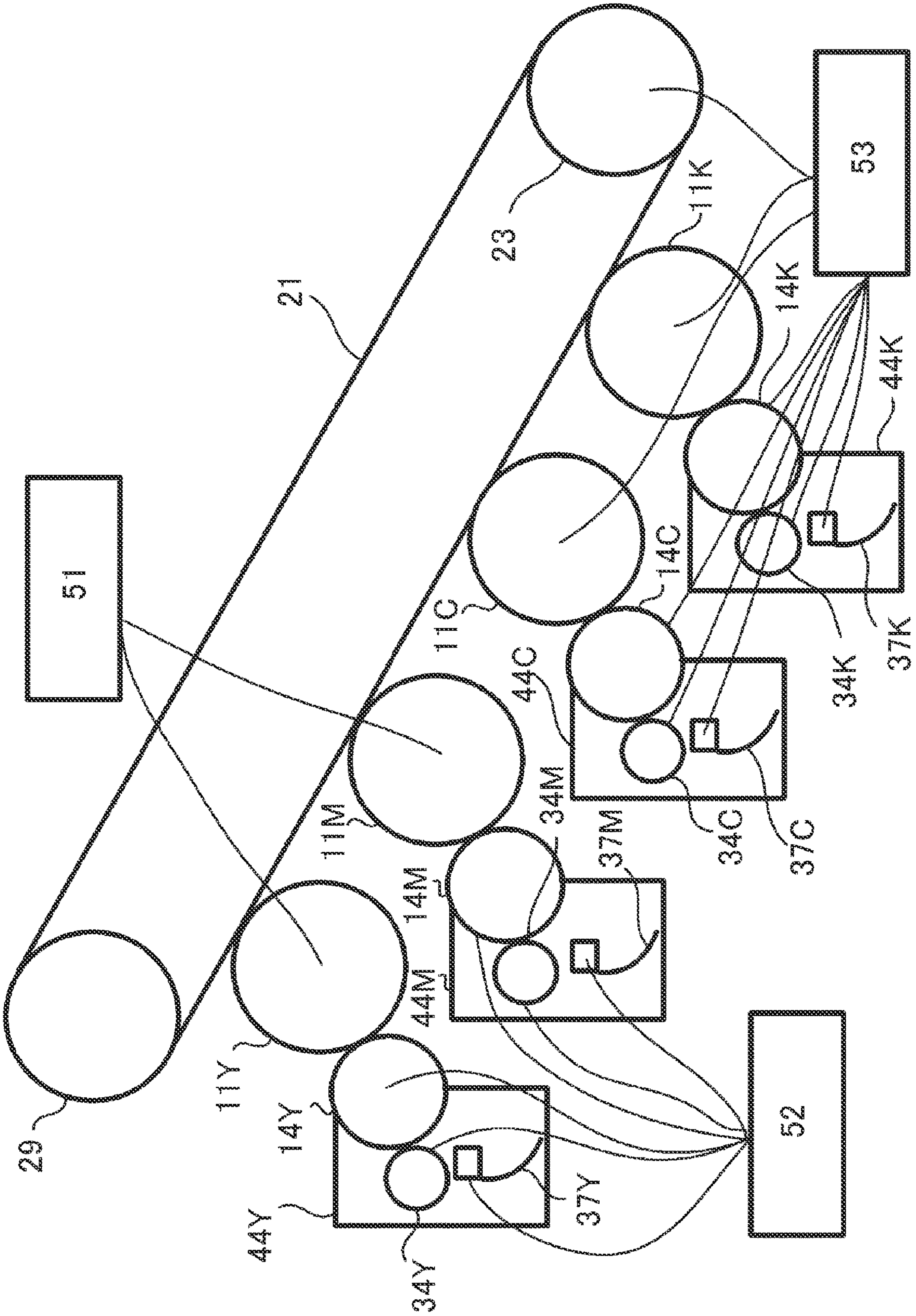
FIG. 10 is a schematic view of a drive connecting configuration according to a second embodiment.

FIG. 10 is a schematic view showing a drive connecting configuration according to the second embodiment of the present invention. As illustrated, in the second embodiment, driving unit configured so as to form a C toner image, driving unit configured so as to form a Bk toner image, and driving unit of the intermediate transfer belt 21 are constituted by a single shared drive motor 53. Apparatus configurations other than those described above are similar to those of the first embodiment and a repeated description thereof will be omitted.

TABLE 5

| Color | Y | M | C | K |
|---|---|---|---|---|
| Average particle size (μm) | 7.5 | 7.5 | 6.5 | 6.5 |

Table 5 shows an average particle size of toner of each color respectively stored in each developer container 42Y, 42M, 42C, or 42K in a full-color image forming apparatus according to the present embodiment. As is apparent from the table, the average particle sizes of toners for C and Bk which are non-designated colors of the wide color gamut mode are smaller than the average particle sizes of toners for Y and M which are designated colors of the wide color gamut mode. Small particle size toners are used with respect to non-designated colors in this manner in expectation of the effects of color gamut enlargement and increased definition due to adopting small particle size toners.

Figure 6:
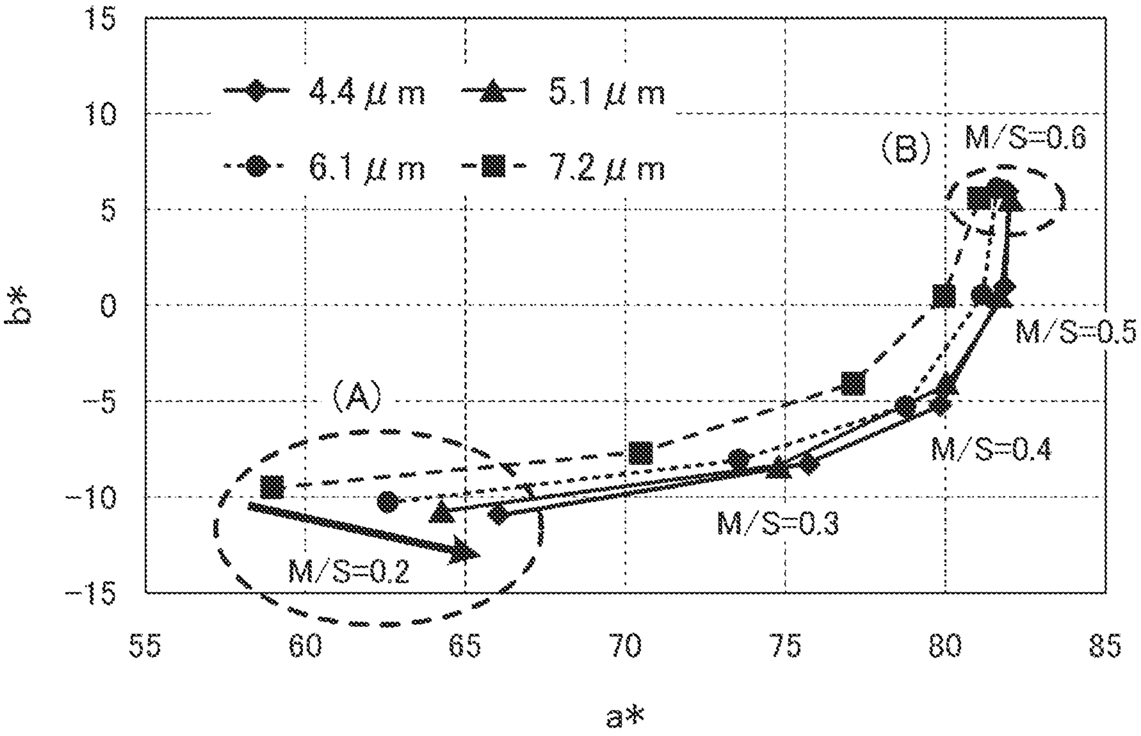
FIG. 6 shows an experimental result indicating color reproduction ranges when varying an average toner particle size.

FIG. 6 shows color reproduction ranges when varying an average toner particle size. While a difference in color reproduction ranges due to a difference in toner particle sizes is not clearly visible in a region of M/S=0.6 mg/cm$^2$ because the toner hides the base, with smaller toner amounts, results were obtained indicating that the smaller the toner particle size, the greater the enlargement of a color gamut. In other words, it is shown that the smaller the value of M/S, the larger a change in a value of an a axis in an L*a*b* color system (CIE) due to a difference in average toner particle size and, in particular, the color gamut changes noticeably in a region of M/S=0.2 mg/cm$^2$ of a portion (A) enclosed by a dash line in FIG. 6. It should be noted that the L axis in the L*a*b* color system (CIE) is an axis perpendicular to a paper plane in FIG. 6. M/S of a monochrome (non-designated color) in the wide color gamut mode according to the present embodiment is 0.45 mg/cm$^2$ shown in Table 3 of the first embodiment and a color gamut enlargement effect due to a reduced toner particle size is produced.

Table 6 represents results of a comparative experiment performed using the image forming apparatus according to the present embodiment and a comparative object example with respect to densities of a designated color monochrome and a non-designated color multicolor in the wide color gamut mode and a color difference between the two colors. Highly-white paper GF-C081 (81.4 g/m2) manufactured by Canon Inc. was used as the recording material and chromaticity and density were measured using Spectrolino (Backing Black) manufactured by X-Rite, Incorporated.

TABLE 6

| | Difference of non-designated color (C) from normal mode | | | |
|---|---|---|---|---|
| | Average particle size of toner | Color | Density | ΔE (relative to normal mode) |
| Normal mode | 6.5 μm | C 100% | 1.45 | |
| Wide color gamut mode limited to designated color (comparative conventional example) | 7.5 μm | C 100% | 1.31 | 4.8 |
| Wide color gamut mode limited to designated color (2nd embodiment) | 6.5 μm | C 100% | 1.44 | 1.1 |

| | Difference of designated color (M, and Y) from normal mode<br>Color | C* |
|---|---|---|
| Normal mode | Red (M 100%, Y 100%) | 78 |
| Wide color gamut mode limited to designated color (2nd embodiment) | Red (M 100%, Y 100%) | 83 |

Table 6 reveals the following.

As a difference of the non-designated color (C) from the normal mode, in the comparative conventional example which uses a same average toner particle size of 7.5 μm as other colors even in the wide color gamut mode limited to a designated color, density is lower than in the normal mode.

On the other hand, the reduction in toner particle size (6.5 μm) according to the present embodiment enables the color difference of the normal mode to be set to 1.1 which is equal to or smaller than the color difference ΔE* 0.8 to 1.6 that is an AA-grade tolerance (JIS Z8721).

At the same time, taking a multicolor (red) created with the designated colors (M and Y) as an example, chroma C* of the multicolor is larger than in the normal mode and a wide color gamut is realized.

In other words, it was found that, even when M/S is the same, the use of a small-particle size toner results in a wider color gamut (~ higher density) and a smaller color difference from a multicolor (designated color).

It should be noted that an average particle size and a particle size distribution of toners can be measured using various methods including a Coulter Counter TA-II or a Coulter Multisizer (both manufactured by Beckman Coulter, Inc.). For example, measurements can be performed using a Coulter Multisizer (manufactured by Beckman Coulter, Inc.). An interface (manufactured by Nikkaki Bios Co., Ltd.) for outputting a number distribution and a volume distribution and a PC9801 personal computer (manufactured by NEC Corporation) are connected to the Coulter Multisizer. As an electrolytic solution, grade 1 sodium chloride can be used and a preparation of a 1% NaCL aqueous solution can be used. As the Coulter Multisizer, for example, ISOTON R-II (manufactured by Coulter-Scientific Japan Co. Ltd.) can be used.

As a measurement method, 0.1 to 5 ml of a surfactant (favorably, an alkyl benzene sulfonic acid salt) is added as a dispersing agent to 100 to 150 ml of the electrolytic aqueous solution described above and, furthermore, 2 to 20 mg of a measurement sample is added thereto. The electrolytic solution with the sample being suspended therein is subjected to a dispersion process of approximately 1 to 3 minutes by an ultrasonic disperser and, using a 100 μm aperture as an aperture, the number of toner particles equal to or larger than 2 μm in the sample is measured by the Coulter Multisizer. Accordingly, a number distribution is calculated and a number average particle size (D) is obtained.

As described above, according to the present embodiment, in an image forming apparatus having a print condition in which a designated color to which a wide color gamut mode is applied and a non-designated color to which the wide color gamut mode is not applied coexist, a color difference and a difference in image quality between the designated color and the non-designated color of the wide color gamut can be reduced. In addition, an image forming apparatus which prevents consumption of lifetime of a non-designated color from being unnecessarily promoted while exhibiting an original color gamut-enlarging effect can be provided.

Third Embodiment

In the first embodiment, a mode of respectively adding to pieces of image data of Y, M, and C or a mode of alternatively adding image data of Y, M, or C in correspondence to an image portion indicated by Bk image data has been described. In addition, in the second embodiment, a case has been described where a toner with a smaller average particle size than the designated color is used for non-designated colors (Bk and C (cyan)) to increase monochrome density when a same toner amount (M/S) is borne. However, the first and second embodiments are not limited to modes in which the embodiments are respectively independently implemented. The first embodiment and the second embodiment may be implemented side by side.

Specifically, an average particle size of the toner of the non-designated color (Bk) according to the first embodiment can be set smaller than a designated color as disclosed in the second embodiment. It has been confirmed that images with higher definition with respect to the non-designated color can be obtained as compared to the first embodiment by setting a smaller average particle size for the toner of the non-designated color.

While an operation for changing a peripheral velocity ratio of a developing roller relative to a photosensitive drum has been described as an operation for increasing a developer supply capability of an image forming portion, the present invention is not limited to this configuration. For example, when an image forming apparatus is configured so as to have a sufficient amount of toner on a developing sleeve in a so-called two-component developing system, an output of a primary transfer bias of each color may suffice.

As described above, according to the present disclosure, when a designated color to which a wide color gamut mode is applied and a non-designated color to which the wide color gamut mode is not applied are provided, a color difference and a difference in image quality between the designated color and the non-designated color can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-090100, filed May 8, 2018, which is hereby incorporated by reference herein in its entirety.

What is claimed is:

1. An image forming apparatus having an image forming portion capable of forming an image on a recording material using developer images of a plurality of colors including a first color which is black and a second color which is a color other than black, the image forming apparatus comprising:

a data generator which generates first image data for forming a developer image of the first color and second image data for forming a developer image of the second color; and a unit which superimposes and forms developer images of a plurality of colors based on the first image data and the second image data generated by the data generator, wherein the image forming portion includes:

a first image bearing member corresponding to the first color;

a second image bearing member corresponding to the second color;

a first light-emitting unit which irradiates a surface of the first image bearing member with light and which forms an electrostatic latent image based on the first image data;

a second light-emitting unit which irradiates a surface of the second image bearing member with light and which forms an electrostatic latent image based on the second image data;

a first developing member which supplies developer to the electrostatic latent image formed on the first image bearing member; and a second developing member which supplies developer to the electrostatic latent image formed on the second image bearing member, wherein the image forming portion operates in a normal mode and a wide color gamut mode, with a developer supply capability from the second developing member to the second image bearing member in the wide color gamut mode being greater than that in the normal mode, and wherein when operating in the wide color gamut mode, the data generator generates:

(i) image data of the second color in gray image or black image corresponding to an image portion indicated by the first image data or image data of a plurality of colors constituting the second color in the gray image or the black image corresponding to the image portion, and (ii) image data in the gray image or the black image formed by the first color and the second color, in which a ratio of a proportion of the second color to a proportion of the first color is greater than the ratio of a proportion of the second color to a proportion of the first color in the normal mode and in which a total amount of the developer of the first color and the second color is greater than the total amount of the developer in the normal mode, corresponding to an image portion indicated by the first image data.

2. The image forming apparatus according to claim 1, wherein the data generator generates the image data of the second color or the image data of the plurality of colors such that a color difference between (i) a case in which an image portion indicated by the first image data is formed solely based on the first image data in the normal mode in which the image forming portion is operated without increasing the developer supply capability and (ii) a case in which the image portion indicated by the first image data is formed by adding image data of the second color corresponding to the image portion indicated by the first image data to the second image data or generating image data of the plurality of colors constituting the second color corresponding to the image portion in the wide color gamut mode is equal to or less than a prescribed amount.

3. The image forming apparatus according to claim 1, wherein a charge amount (Q/S) per unit area in an image portion indicated by the first image data of a developer image formed on a recording material is greater in (i) a case in which the image portion is formed by adding image data of the second color corresponding to the image portion indicated by the first image data to the second image data or generating image data of the plurality of colors constituting the second color corresponding to the image portion in the wide color gamut mode than in (ii) a case in which the image portion is formed solely based on the first image data in the normal mode in which the image forming portion is operated without increasing the developer supply capability.

4. The image forming apparatus according to claim 1, wherein an average particle size of the developer of the first color is smaller than an average particle size of the developer of the second color.

5. The image forming apparatus according to claim 1, further comprising:

an intermediate transfer member to which a plurality of developer images respectively formed on a plurality of image bearing members including the first image bearing member and the second image bearing member are transferred in a superimposed manner, the transferred developer images constituted by a plurality of colors being transferred to the recording material;

a first driving source which supplies a driving force for driving the second image bearing member;

a second driving source which supplies a driving force for driving the second developing member; and a third driving source which supplies a driving force for driving the intermediate transfer member.

6. The image forming apparatus according to claim 5, further comprising:

an applying unit which applies a primary transfer bias to a plurality of primary transfer portions in which developer images are respectively transferred from the plurality of image bearing members to the intermediate transfer member, wherein the applying unit applies the primary transfer bias such that a ratio of a magnitude of a current flowing through the primary transfer portions with respect to a process speed that is a speed of image formation is greater in the wide color gamut mode than in the normal mode.

7. The image forming apparatus according to claim 6, wherein when It denotes an amount of current flowing through the primary transfer portions, Q/S denotes a charge amount of a developer per unit area in a developer image to be transferred to the intermediate transfer member, PS denotes the process speed, and W denotes a width of the developer image to be transferred to the intermediate transfer member, $$It = Q/S \times PS \times W$$

is satisfied.

8. The image forming apparatus according to claim 1, wherein a development contrast representing a magnitude of an absolute value of a difference between a developing bias applied to a developer bearing member which bears a developer to be supplied to the second image bearing member in the second developing member and a light-part potential in an electrostatic latent image formed on the second image bearing member by the second light-emitting unit in the wide color gamut mode is greater than the development contrast in the normal mode.

9. The image forming apparatus according to claim 1, wherein a magnitude of an absolute value of a difference between a dark-part potential and a light-part potential in an electrostatic latent image formed on the second image bearing member by the second light-emitting unit in the wide color gamut mode is greater than a magnitude of an absolute value of a difference between the dark-part potential and the light-part potential in the normal mode.

10. The image forming apparatus according to claim 1, wherein a peripheral velocity of the first image bearing member and a peripheral velocity of the second image bearing member in the wide color gamut mode are lower than the peripheral velocity of the first image bearing member and the peripheral velocity of the second image bearing member in the normal mode, wherein a peripheral velocity of the first developing member and a peripheral velocity of the second developing member in the wide color gamut mode are lower than the peripheral velocity of the first developing member and the peripheral velocity of the second developing member in the normal mode, and wherein, in the wide color gamut mode, the peripheral velocity of the first developing member is lower than the peripheral velocity of the second developing member.

11. The image forming apparatus according to claim 1, wherein a peripheral velocity ratio between the second image bearing member and the second developing member, which are respectively rotationally driven in the wide color gamut mode, is greater than the peripheral velocity ratio in the normal mode.

* * * * *